United States Patent
Kang et al.

(10) Patent No.: US 11,302,981 B2
(45) Date of Patent: Apr. 12, 2022

(54) BATTERY PACK

(71) Applicant: SAMSUNG SDI CO., LTD., Yongin-si (KR)

(72) Inventors: Il Oh Kang, Yongin-si (KR); Dae Yon Moon, Yongin-si (KR)

(73) Assignee: SAMSUNG SDI CO., LTD., Yongin-si (KR)

( * ) Notice: Subject to any disclaimer, the term of this patent is extended or adjusted under 35 U.S.C. 154(b) by 0 days.

(21) Appl. No.: 16/587,312

(22) Filed: Sep. 30, 2019

(65) Prior Publication Data

US 2020/0243814 A1 Jul. 30, 2020

(30) Foreign Application Priority Data

Jan. 28, 2019 (KR) .................. 10-2019-0010689

(51) Int. Cl.
*H01M 50/20* (2021.01)
*H01M 10/42* (2006.01)

(52) U.S. Cl.
CPC .......... *H01M 50/20* (2021.01); *H01M 10/425* (2013.01)

(58) Field of Classification Search
CPC ...... H01M 2/10; H01M 10/42; H01M 2/1077; H01M 10/425; H01M 50/20; H01M 50/519; H01M 50/213; H01M 50/583; H01M 50/55; H01M 2200/103; H01M 50/50; H01M 50/502; H01M 2010/4271; H01M 10/4257
See application file for complete search history.

(56) References Cited

U.S. PATENT DOCUMENTS 5,644,282 A * 7/1997 Mehta ................. H01M 50/581
 337/295
6,495,787 B1 12/2002 Nadeau et al.
(Continued)

FOREIGN PATENT DOCUMENTS

DE 102013217784 A1 * 3/2015 ............ H01M 2/206
DE 102013217784 A1 3/2015
(Continued)

OTHER PUBLICATIONS

Machine Translation of DE-102013217784-A1 (Year: 2015).*
European Search Report dated Jun. 25, 2020.

*Primary Examiner* — Maria Laios
*Assistant Examiner* — Grace Ann Kenlaw
(74) *Attorney, Agent, or Firm* — Lee IP Law, P.C.

(57) ABSTRACT

A battery pack including a plurality of battery cells, each battery cell having a positive electrode and a negative electrode on a top surface of the battery cell, the battery cells being arranged in a first direction and in a second direction crossing the first direction; a protective circuit module, the protective circuit module including a printed circuit board on the battery cells, and a plurality of conductive tabs on the printed circuit board and electrically connecting the battery cells; and a case accommodating the battery cells and the protective circuit module, wherein each of the conductive tabs include a substrate connector connected to the printed circuit board, a cell connector electrically connected to a battery cell, and a fusible link extending from the substrate connector and having a width that is smaller than that of the substrate connector.

10 Claims, 8 Drawing Sheets

(56) References Cited

U.S. PATENT DOCUMENTS

| | | | |
|---|---|---|---|
| 7,429,290 B2* | 9/2008 | Lally | C09D 5/18 |
| | | | 106/18.14 |
| 7,671,565 B2* | 3/2010 | Straubel | B60L 3/0069 |
| | | | 320/134 |
| 9,716,391 B2 | 7/2017 | Kano | |
| 9,893,333 B2 | 2/2018 | Hoshi et al. | |
| 10,195,957 B2 | 2/2019 | Kano | |
| 2001/0049009 A1* | 12/2001 | Cooray | H05K 3/4661 |
| | | | 428/209 |
| 2012/0020036 A1 | 1/2012 | Matsumoto | |
| 2013/0143101 A1 | 6/2013 | Nakagawa et al. | |
| 2015/0194641 A1 | 7/2015 | Tsuji et al. | |
| 2017/0025660 A1* | 1/2017 | Shin | H01M 50/502 |
| 2017/0264107 A1 | 9/2017 | Cheon et al. | |

FOREIGN PATENT DOCUMENTS

| | | | | |
|---|---|---|---|---|
| EP | 3460878 A1 | 3/2019 | | |
| JP | 5807488 B2 | 11/2015 | | |
| JP | 6200675 B2 | 9/2017 | | |
| KR | 10-1805546 B1 | 12/2017 | | |
| WO | WO-2017004078 A1 * | 1/2017 | | H01M 2/1077 |

\* cited by examiner

BATTERY PACK

CROSS-REFERENCE TO RELATED APPLICATION

Korean Patent Application No. 10-2019-0010689, filed on Jan. 28, 2019, in the Korean Intellectual Property Office, and entitled: "Battery Pack," is incorporated by reference herein in its entirety.

BACKGROUND

1. Field

Embodiments relate to a battery pack.

2. Description of the Related Art

An electronic device, e.g., a notebook computer, a mini notebook computer, a net-book, a mobile computer, an ultra-mobile personal computer (UMPC) or a portable multimedia player (PMP), may use a battery pack in which a plurality of batteries connected in series and/or parallel as a portable power supply.

In order to prevent environmental contamination, interest in electric vehicles has increased, and high-capacity battery packs may be used in the electric vehicles. The battery pack may include a protective circuit module (PCM) for protecting battery cells from over-charge, over-discharge, and/or over-current, and multiple battery cells and the PCM may be housed together in a case.

The above information disclosed in this Related Art section is only for enhancement of understanding of the background and therefore it may contain information that does not form the prior art that is already known to a person of ordinary skill in the art.

SUMMARY

The embodiments may be realized by providing a battery pack including a plurality of battery cells, each battery cell having a positive electrode and a negative electrode on a top surface of the battery cell, the plurality of battery cells being arranged in a first direction and in a second direction crossing the first direction; a protective circuit module, the protective circuit module including a printed circuit board on the plurality of battery cells, and a plurality of conductive tabs on the printed circuit board and electrically connecting the plurality of battery cells; and a case accommodating the plurality of battery cells and the protective circuit module, wherein each of the conductive tabs include a substrate connector connected to the printed circuit board, a cell connector electrically connected to a battery cell of the plurality of battery cells, and a fusible link extending from the substrate connector and having a width that is smaller than that of the substrate connector.

The substrate connector may include a first electrode substrate connector connected to the cell connector and a second electrode substrate connector spaced a predetermined distance apart from the first electrode substrate connector on the same plane, and the fusible link may connect the first electrode substrate connector with the second electrode substrate connector and is bent to then detour at least one times on a plane.

The fusible link may be in contact with the printed circuit board.

The fusible link may be spaced apart from a top surface of the printed circuit board in a third direction crossing the first direction and the second direction.

The battery pack may further include a flame-retardant coating between the top surface of the printed circuit board and the fusible link.

The cell connector may be lower than the substrate connector and may include at least one stepped portion connecting the cell connector with the substrate connector.

The conductive tabs may include a plurality of connection tabs connecting a row of neighboring battery cells in the second direction; a plurality of positive cell tabs electrically connected to a first column of battery cells at a first side of the plurality of battery cells, the first column of battery cells being arranged in the first direction; and a plurality of negative cell tabs electrically connected to a second column of battery cells at a second side of the plurality of battery cells, the second column of battery cells being arranged in the first direction.

The plurality of connection tabs, the plurality of positive cell tabs, and the plurality of negative cell tabs may be on a top surface of the printed circuit board.

The printed circuit board may include a plurality of throughholes passing therethrough, the plurality of throughholes being aligned with tops of the plurality of battery cells, and the plurality of connection tabs, the plurality of positive cell tabs, and the plurality of negative cell tabs may pass through the throughholes and are electrically connected to the plurality of battery cells, respectively.

The battery pack may further include a holder, the holder including a plurality of receivers arranged in the first direction and the second direction, the plurality of receivers passing through the holder, accommodating the plurality of battery cells in the receivers, and having the protective circuit module thereon; and bus bars in the holder, the bus bars including a positive bus bar electrically connected to the plurality of positive cell tabs through the printed circuit board, and a negative bus bar electrically connected to the plurality of negative cell tabs through the printed circuit board.

The battery pack may further include a fuse in the negative bus bar, the fuse being cut off when an internal short circuit or an external short circuit is generated in the battery pack.

The embodiments may be realized by providing a battery pack including a plurality of battery cells, each battery cell having a positive electrode and a negative electrode on a top surface of the battery cell, the plurality of battery cells being arranged in a row direction and in a column direction crossing the row direction; a protective circuit module, the protective circuit module including a printed circuit board on the plurality of battery cells, and a plurality of conductive tabs on the printed circuit board and electrically connecting the plurality of battery cells; and a case accommodating the plurality of battery cells and the protective circuit module, wherein the plurality of conductive tabs include a plurality of connection tabs electrically connecting a row of neighboring battery cells in the row direction; a plurality of positive cell tabs electrically connected to a first column of battery cells at a first side of the plurality of battery cells, the first column of battery cells being arranged in the column direction; and a plurality of negative cell tabs electrically connected to a second column of battery cells at a second side of the plurality of battery cells, the second column of battery cells being arranged in the column direction, and wherein each of the connection tabs, the positive cell tabs, and the negative cell tabs includes a substrate connector connected to the printed circuit board, a cell connector electrically connected to a battery cell of the plurality of battery cells, and a fusible link extending from the substrate connector and having a width that is smaller than that of the substrate connector.

The embodiments may be realized by providing a battery pack in which a plurality of battery cells are accommodatable, each battery cell having a positive electrode and a negative electrode on a top surface thereof and the plurality of battery cells being arrangeable in a row direction and in a column direction crossing the row direction, the battery pack including a protective circuit module, the protective circuit module including a printed circuit board to cover the plurality of battery cells, and a plurality of conductive tabs on the printed circuit board to electrically connect the plurality of battery cells; and a case to accommodate the plurality of battery cells and the protective circuit module, wherein each of the conductive tabs include a substrate connector connected to the printed circuit board, a cell connector to electrically connect to a battery cell of the plurality of battery cells, and a fusible link extending from the substrate connector and having a width that is smaller than that of the substrate connector.

BRIEF DESCRIPTION OF THE DRAWINGS

Features will be apparent to those of skill in the art by describing in detail exemplary embodiments with reference to the attached drawings in which.

DETAILED DESCRIPTION

Figure 1A:
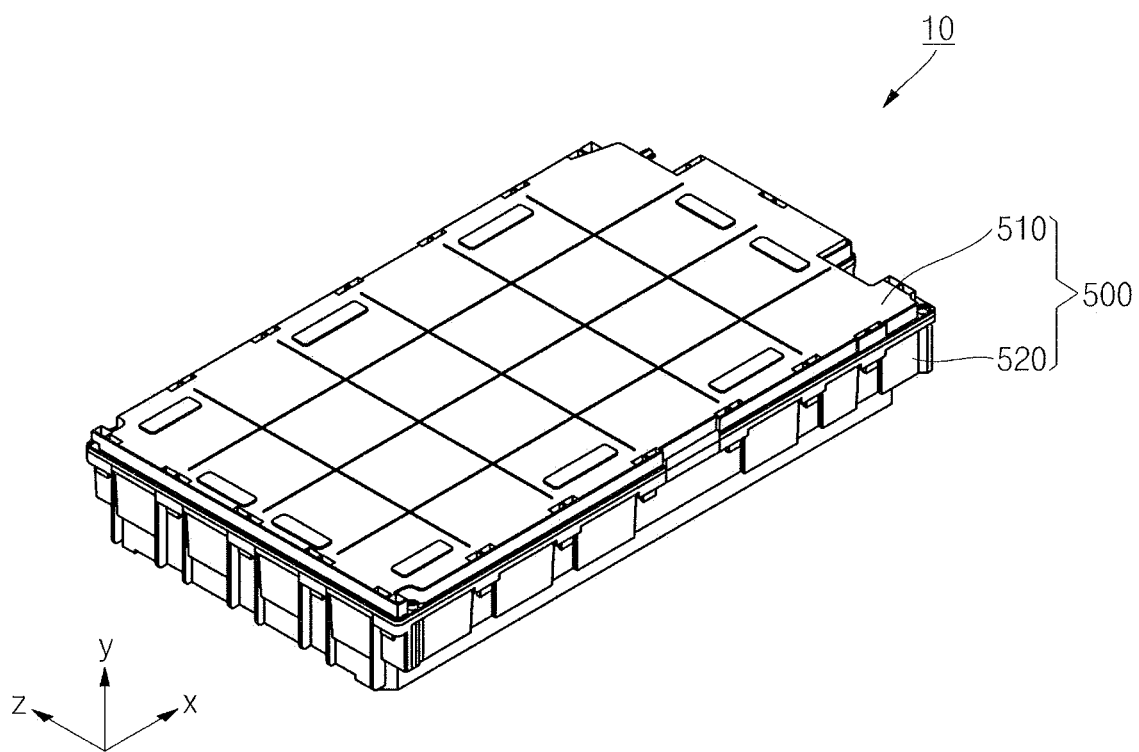
FIGS. 1A and 1B illustrate a perspective view and an exploded perspective view of a battery pack according to an embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

It will also be understood that when a layer or element is referred to as being "on" another layer or element, it can be directly on the other layer or element, or intervening layers may also be present. In addition, it will also be understood that when a layer is referred to as being "between" two layers, it can be the only layer between the two layers, or one or more intervening layers may also be present.

In addition, in the accompanying drawings, sizes or thicknesses of various components are exaggerated for brevity and clarity. Like numbers refer to like elements throughout. In addition, it will be understood that when an element A is referred to as being "connected to" an element B, the element A can be directly connected to the element B or an intervening element C may be present and the element A and the element B are indirectly connected to each other.

The terminology used herein is for the purpose of describing particular embodiments only and is not intended to be limiting of the disclosure. As used herein, the singular forms are intended to include the plural forms as well, unless the context clearly indicates otherwise. It will be further understood that the terms "comprise," "include," "comprising," and/or "including," when used in this specification, specify the presence of stated features, numbers, steps, operations, elements, and/or components, but do not preclude the presence or addition of one or more other features, numbers, steps, operations, elements, components, and/or groups thereof.

It will be understood that, although the terms first, second, etc. may be used herein to describe various members, elements, regions, layers and/or sections, these members, elements, regions, layers and/or sections should not be limited by these terms. These terms are only used to distinguish one member, element, region, layer and/or section from another. Thus, for example, a first member, a first element, a first region, a first layer and/or a first section discussed below could be termed a second member, a second element, a second region, a second layer and/or a second section without departing from the teachings of the present disclosure.

Spatially relative terms, such as "below," "beneath," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "on" or "above" the other elements or features. Thus, the exemplary term "below" can encompass both an orientation of above and below.

Figure 1B:
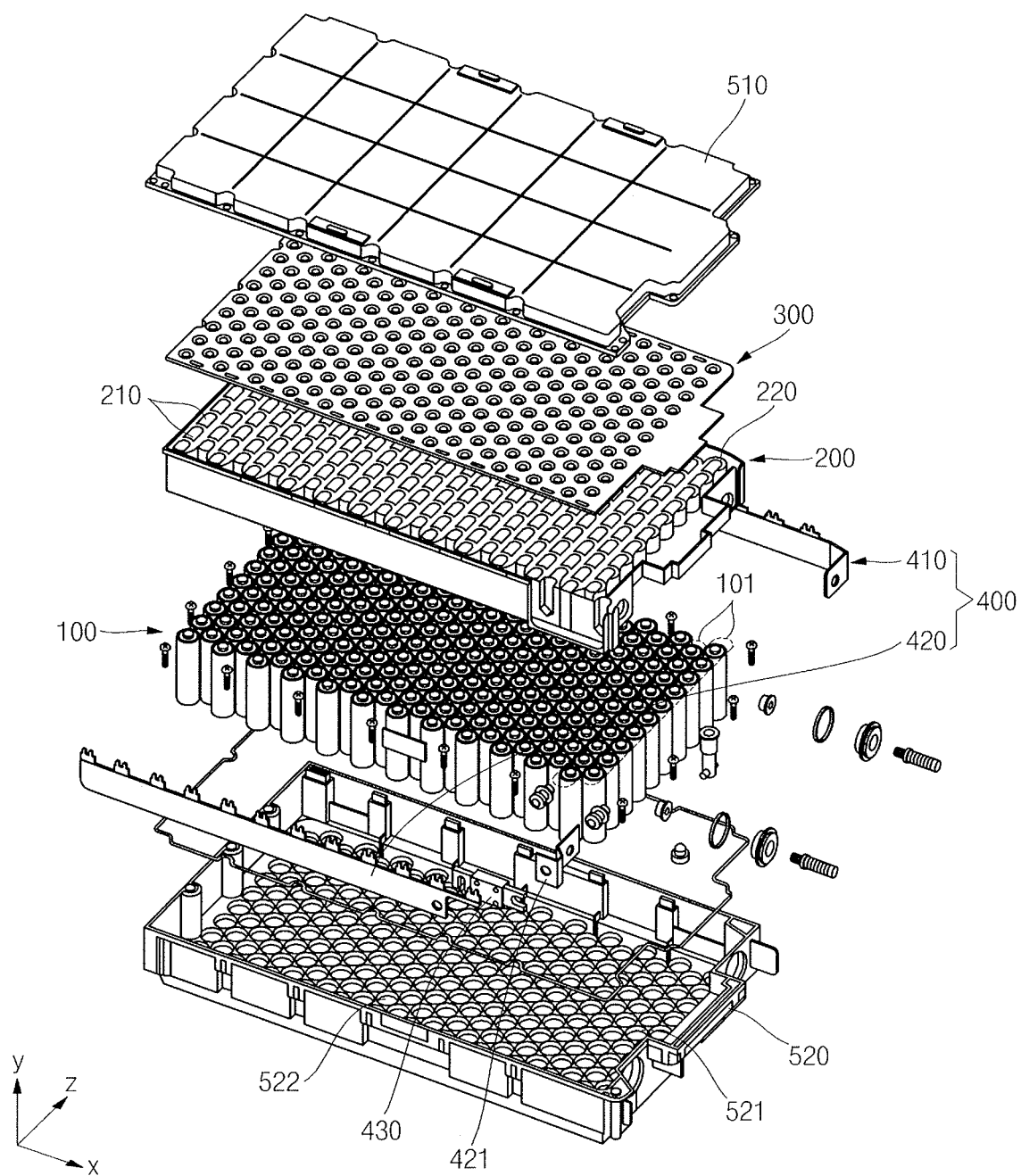

FIGS. 1A and 1B illustrate a perspective view and an exploded perspective view illustrating a battery pack according to an embodiment.

As illustrated in FIGS. 1A and 1B, the battery pack 10 may include or accommodate a plurality of battery cells 100, a holder 200 (fixing the plurality of battery cells 100), a protective circuit module (PCM) 300 including a plurality of conductive tabs (320, 330 and 340 of FIGS. 4A to 4C) electrically connected to the plurality of battery cells 100, bus bars 400 electrically connected or connectable to the plurality of battery cells 100, and a case 500 accommodating the plurality of battery cells 100, the holder 200, the PCM 300 and the bus bars 400. The battery pack 10 may be a high-capacity battery mounted in an electric vehicle.

The plurality of battery cells 100 may be secondary batteries that supply an external electronic device with power and are rechargeable. In an implementation, the battery cells 100 may be, e.g., lithium polymer cells, lithium polymer ion cells, lithium ion cells, zinc air cells, lithium sulfur cells, lithium air cells, sodium ion cells, magnesium cells, or all-solid cells. In an implementation, as illustrated in FIG. 1B, the plurality of battery cells 100 may be cylindrical battery cells. In an implementation, the plurality of battery cells 100 may be, e.g., pouch battery cells or prismatic battery cells. In an implementation, the plurality of battery cells 100 may be battery cells having the same shape.

For brevity, the following description will be made with regard to a case where the plurality of battery cells 100 are cylindrical battery cells.

Figure 2:
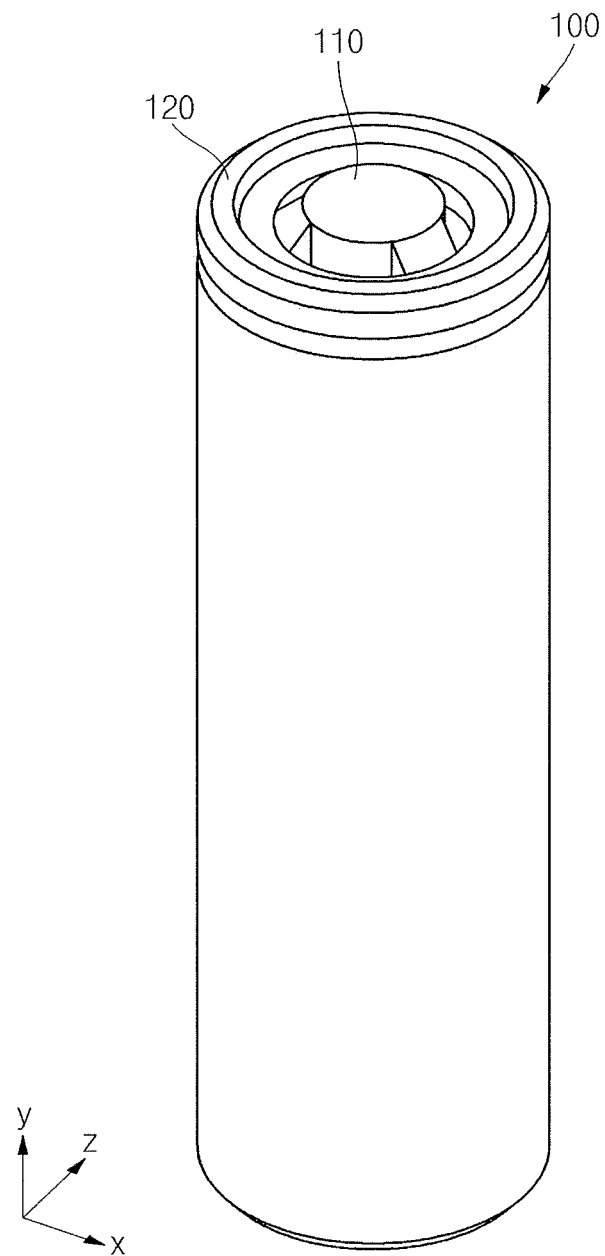
FIG. 2 illustrates an enlarged perspective view of a battery cell of FIG. 1B.

As illustrated in FIG. 2, the battery cells 100 may be cylindrical battery cells extending in a third direction (y), which is a lengthwise direction of each battery cell, and each of the battery cells 100 may include both electrodes 110 and 120 (having different polarities) at a same end in the y direction (e.g., at its top end or bottom end). The battery cell 100 may include an electrode assembly accommodated in a cylindrical case having a top opening, and a cap plate sealing the top opening of the case. In an implementation, the positive electrode 110 may be at a center of the top end of the case, where the cap plate is positioned, and the negative electrode 120 may be at a crimping region of the case, upwardly extending to cover the edge part of the cap plate. For example, in the battery cell 100, the cap plate may function as a positive electrode, and the case may function as a negative electrode.

In an implementation, in a case where the plurality of battery cells 100 are pouch battery cells or prismatic battery cells, rather than the cylindrical battery cells, the positive electrode 110 and the negative electrode 120 may be positioned at the top end of the battery cell 100 so as to be spaced apart from each other.

Figure 3:
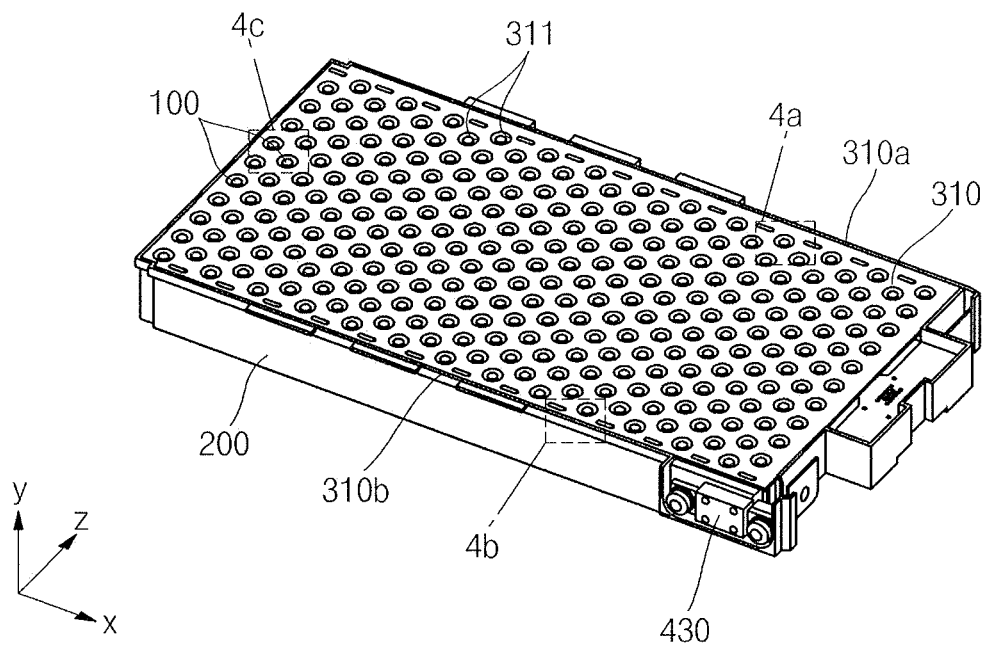
FIG. 3 illustrates a perspective view of the connection relationship among a holder, a protection circuit module, and a bus bar of FIG. 1B.

The holder 200 have a substantially hexahedron shape having a plurality of receivers 210 passing through or between its top and bottom surfaces to allow the plurality of battery cells 100 to be placed therein. Referring to FIG. 3, a perspective view, illustrating the connection relationship among the holder 200, the PCM 300, and the bus bar 400, is illustrated. Hereinafter, configurations of the holder 200, the PCM 300, and the bus bars 400 will be described with reference to FIGS. 1B and 3.

The holder 200 may include ribs 220 partitioning the plurality of receivers 210, and the plurality of battery cells 100 may be accommodated in the plurality of receivers 210, respectively. The plurality of receivers 210 of the holder 200 may have shapes corresponding to those the plurality of battery cells 100. For example, if the plurality of battery cells 100 are cylindrical battery cells, the plurality of receivers 210 may also be cylindrical. The plurality of battery cells 100 may be inserted into the plurality of receivers 210 in a lengthwise direction.

The holder 200 may include the plurality of receivers 210 regularly arranged in row and column directions parallel with side surfaces of the holder 200. For example, the row direction in which the plurality of receivers 210 are arranged in the holder 200 may be a second direction (z) perpendicular to the third direction (y), which is parallel with a first side surface of the holder 200. In addition, the column direction in which the plurality of receiving units 210 are arranged may be perpendicular to the third direction (y) and the second direction (z), and may be a first direction (x), which is parallel with the second side surface of the holder 200. Here, the first direction (x) may be a lengthwise (e.g., longer side) direction of the holder 200, and the second direction (z) may be a widthwise (e.g., shorter side) direction of the holder 200. The plurality of battery cells 100 may be accommodated in the plurality of receivers 210 of the holder 200 and may be regularly arranged in the first direction (x) and the second direction (z) in a state in which they are isolated by the ribs 220. For example, top ends of the plurality of battery cells 100 may be exposed to an upper portion of the holder 200, and bottom ends thereof may be exposed to a lower portion of the holder 200. In addition, the positive electrode 110 and the negative electrode 120 may be positioned at the top end of each of the plurality of battery cells 100.

In an implementation, among the plurality of battery cells 100, the battery cells 100 arranged on or along the same line in the second direction (z), which is the widthwise direction of the holder 200, may be regarded as one of a plurality of battery groups 101. In an implementation, the plurality of battery cells 100 may include the plurality of battery groups 101 arranged in or along the first direction (x), which is the lengthwise direction of the holder 200.

The PCM 300 may be on the top surface of the holder 200. The PCM 300 may include a printed circuit board 310 having a plurality of circuit devices mounted thereon, and a plurality of conductive tabs 320, 330 and 340 for electrically connecting the plurality of battery cells 100. The plurality of conductive tabs 320, 330 and 340 may include positive cell tabs 320, negative cell tabs 330, and connection tabs 340, which are all mounted on the top surface of the printed circuit board 310 to electrically connect the plurality of battery cells 100.

Figure 4A:
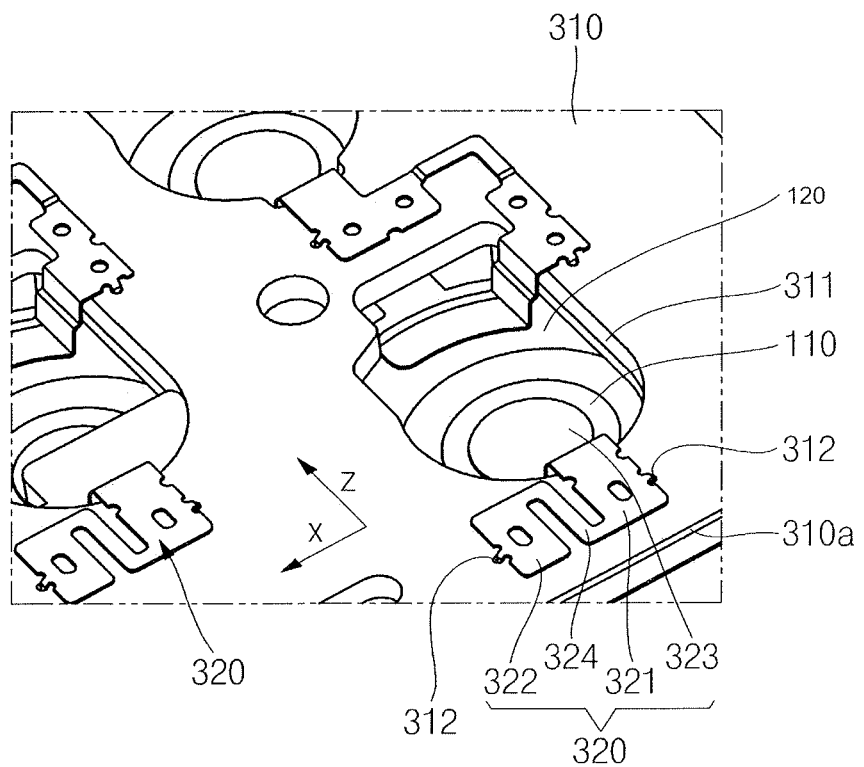
FIGS. 4A, 4B and 4C illustrate enlarged views of portions 4a, 4b and 4c in FIG. 3.
Figure 4B:
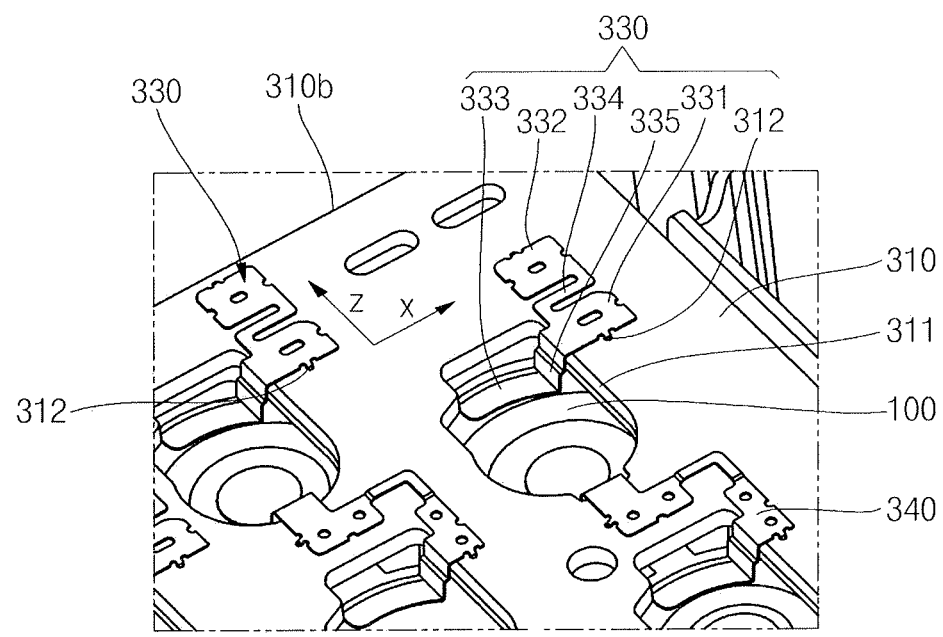
Figure 4C:
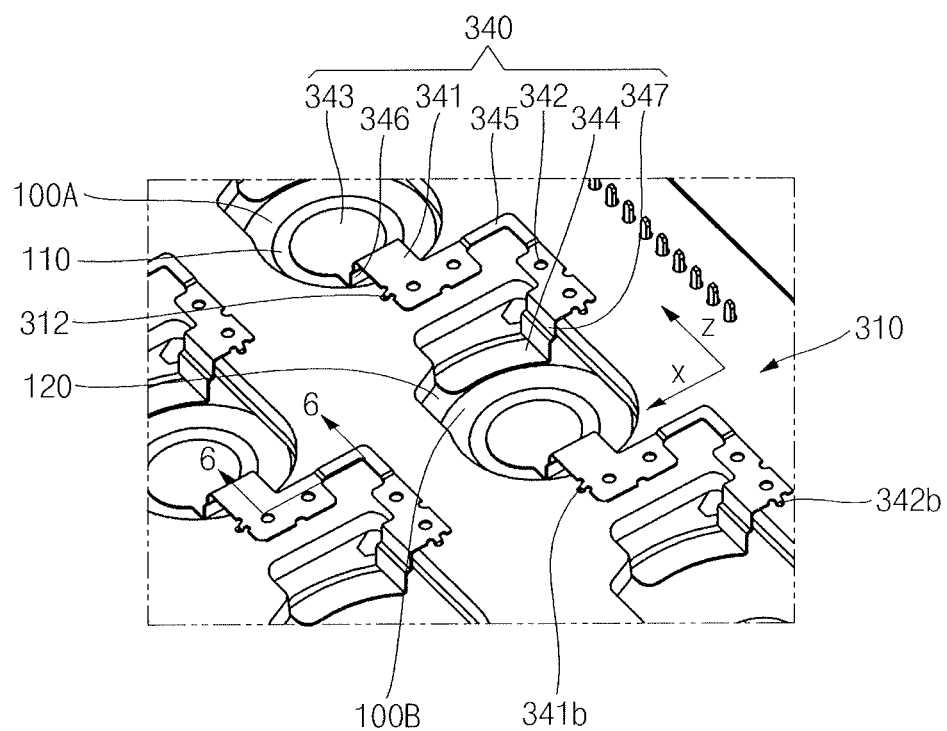
Figure 5A:
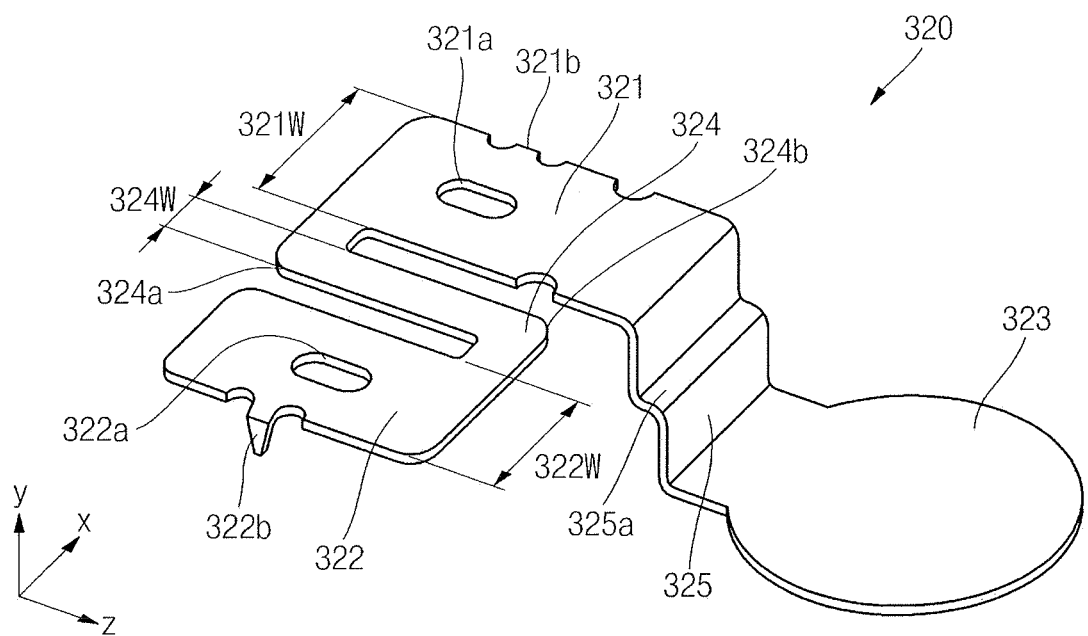
FIGS. 5A, 5B and 5C illustrate perspective views of a first cell tab, a second cell tab, and a connection tab of FIG. 3.
Figure 5B:
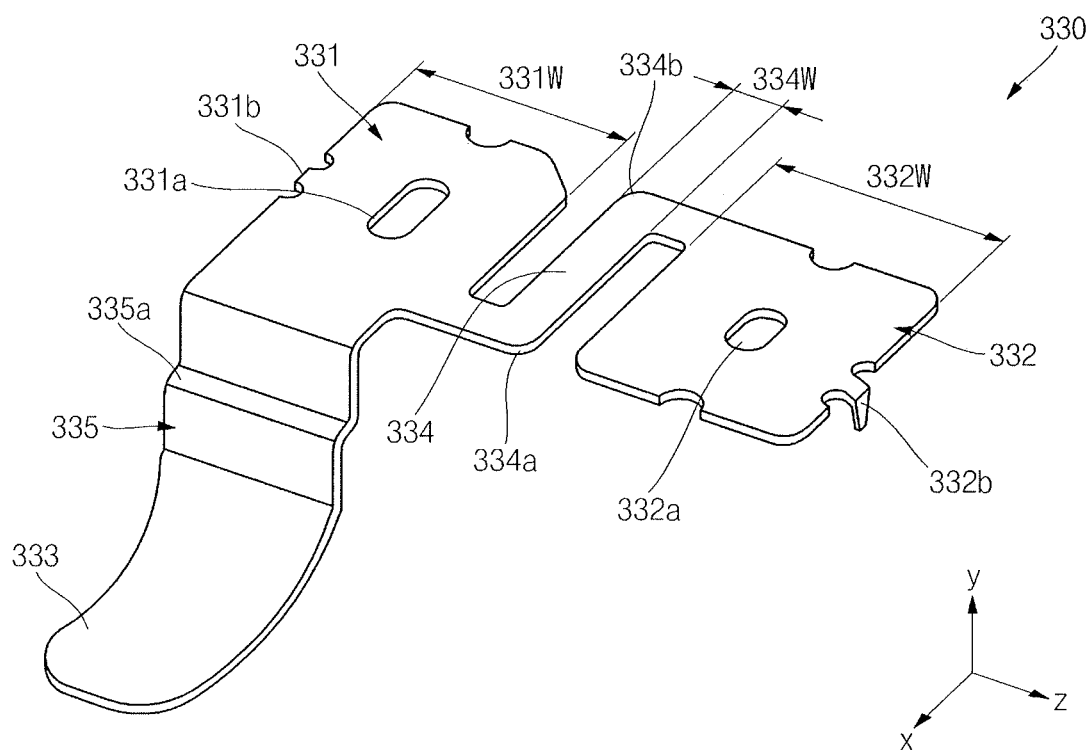
Figure 5C:
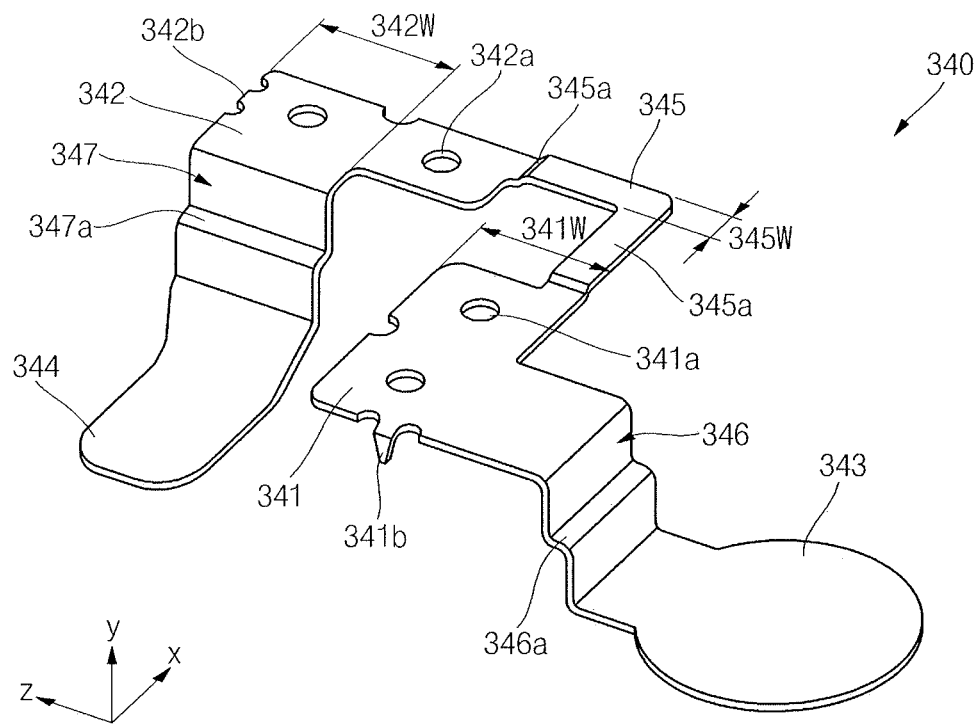

Referring to FIGS. 4A, 4B and 4C, enlarged views of portions 4a, 4b, and 4c in FIG. 3 are illustrated. Referring to FIGS. 5A, 5B and 5C, perspective views of a positive cell tab 320, a negative cell tab 330, and a connection tab 340 shown in FIG. 3 are illustrated. Hereinafter, the PCM 300 will be described with reference to FIGS. 4A 4B. 4C, 5A, 5B and 5C.

The printed circuit board 310 may include throughholes 311 passing therethrough, e.g., between its top and bottom surfaces. The plurality of throughholes may be at regions corresponding to, overlying, or aligned with top portions of the plurality of battery cells 100. In an implementation, the printed circuit board 310 may include an substantially planar insulation layer, a plurality of circuit patterns, and a plurality of connection pads, which are electrically disconnected or isolated by the insulation layer. The connection pads may be portions of the printed circuit board 310, which are electrically connected to the plurality of conductive tabs 320, 330 and 340 and circuit devices. In an implementation, the plurality of circuit patterns may electrically connect the plurality of connection pads in the insulation layer. The PCM 300 may further include circuit devices (e.g., a plurality of voltage sensors) mounted on the connection pads of the printed circuit board 310. The PCM 300 may basically protect the plurality of battery cells 110 by preventing the plurality of battery cells 110 from being over-discharged and/or over-charged or by preventing over-current from flowing through the plurality of battery cells 110.

The plurality of conductive tabs 320, 330, and 340 may be mounted on the connection pads on the top surface of the printed circuit board 310, thereby electrically connecting the plurality of conductive tabs 320, 330, and 340 to the printed circuit board 310. The plurality of conductive tabs 320, 330, and 340 may be electrically connected to the plurality of battery cells 100 through the throughholes 311 in the printed circuit board 310, respectively. The positive electrodes 110 and the negative electrodes 120 of the plurality of battery cells 100 may be positioned lower than the top surface of the printed circuit board 310 in the third direction (y). The plurality of conductive tabs 320, 330, and 340 may include positive cell tabs 320, negative cell tabs 330, and connection tabs 340. In an implementation, each of the positive cell tabs 320, the negative cell tabs 330, and the connection tabs 340 may be one-body, monolithic metal tabs.

The positive cell tabs 320 may be in the throughholes 311 arranged in the first direction (x) at or adjacent to a first side 310a of the top surface of the printed circuit board 310. For example, the positive cell tabs 320 may be electrically connected to (e.g., positive electrodes 110 of) the battery cells among the plurality of battery cells 100, at one-side end and arranged in the first direction (x), which is a column direction, respectively. The positive cell tabs 320 may be electrically connected to a positive electrode bus bar 410 along a first side of the second side surface of the holder 200 through the printed circuit board 310. In an implementation, the negative cell tabs 330 may be in the throughholes 311 arranged in the first direction (x) at or adjacent to a second side 310b of the top surface of the printed circuit board 310, the second side 310b being spaced from the first side 310a along the second direction (z). For example, the negative cell tabs 330 may be electrically connected to (e.g., negative electrodes 120 of) the battery cells among the plurality of battery cells 100, positioned at the second side and arranged in the first direction (x), which is a column direction, respectively. The negative cell tabs 330 may be electrically connected to a negative electrode bus bar 420 along a second side of the second side surface of the holder 200 through the printed circuit board 310.

The positive cell tab 320 may include a first positive electrode substrate connector 321, a second positive electrode substrate connector 322, a first positive cell connector 323, a positive electrode fusible link 324, and a positive electrode stepped portion 325. In an implementation, the first positive electrode substrate connector 321 and the second positive electrode substrate connector 322 may have substantially planar plate shapes, and may be electrically and mechanically connected to connection pads on the top surface of the printed circuit board 310. In an implementation, the connection pads may be electrically connected to voltage sensors through the circuit patterns on the printed circuit board 310. For example, the voltage sensors of the printed circuit board 310 may measure voltages of the battery cells 100 electrically connected to the positive cell tabs 320. The first positive electrode substrate connector 321 and the second positive electrode substrate connector 322 may be on the same plane and may be spaced a predetermined distance apart from each other. In an implementation, the plane may be defined by the first direction (x) and the second direction (z) perpendicular to each other.

Each of the first positive electrode substrate connector 321 and the second positive electrode substrate connector 322 may include at least one soldering hole 321a, 322a passing therethrough, e.g., between top and bottom surfaces. In an implementation, solder may be melted and filled in the soldering holes 321a and 322a in a state in which first positive electrode substrate connector 321 and the second positive electrode substrate connector 322 of the positive cell tab 320 are mounted on the top surface of the connection pad of the printed circuit board 310, thereby electrically connecting the positive cell tab 320 and the printed circuit board 310. In an implementation, the first positive electrode substrate connector 321 and the second positive electrode substrate connector 322 may be mounted on the connection pads on the printed circuit board 310.

In an implementation, the first positive electrode substrate connector 321 and the second positive electrode substrate connector 322 may further include position determining protrusions 321b and 322b, which downwardly protrude (e.g., into the PCM 300), respectively. The position determining protrusions 321b and 322b may be inserted into position determining holes 312 in the printed circuit board 310 to determine positions of the printed circuit board 310, where the positive cell tabs 320 are fixed and coupled. For example, the first positive electrode substrate connector 321 and the second positive electrode substrate connector 322 may help prevent the positive cell tabs 320 from deviating from the printed circuit board 310 by the position determining protrusions 321b and 322b. The second positive electrode substrate connector 322 may be electrically connected to the bus bars 400 through the printed circuit board 310. In an implementation, the first positive electrode substrate connector 321 may be electrically connected to the connection pad of the printed circuit board 310 and may be electrically connected to the first positive cell connector 323 through the positive electrode stepped portion 325. For example, the first positive cell connector 323 may be electrically connected to the printed circuit board 310 through the positive electrode stepped portion 325 and the first positive electrode substrate connector 321.

The first positive cell connector 323 may be a region electrically connected to the positive electrode 110 at the top end of the battery cell 100 that is exposed through the throughhole 311 in the printed circuit board 310. The first positive cell connector 323 may have a substantially planar plate shape. e.g., a circular plate, which corresponds to the shape of the positive electrode 110 of the battery cell 100. The first positive cell connector 323 may be lower than the first positive electrode substrate connector 321 and the second positive electrode substrate connector 322 in the third direction (y).

The positive electrode fusible link 324 may electrically connect the first positive electrode substrate connector 321 and the second positive electrode substrate connector 322, which are spaced apart from each other. The positive electrode fusible link 324 may be positioned on the same plane with the first positive electrode substrate connector 321 and the second positive electrode substrate connector 322. In an implementation, an insulation layer may be positioned on the printed circuit board 310 lower than the positive electrode fusible link 324 (e.g., between the positive electrode fusible link 324 and the printed circuit board 310, and wiring patterns or circuit patterns may not be positioned on the insulation layer. A planar width 324W (e.g., in the x direction) of the positive electrode fusible link 324 may be smaller than a width 321W (e.g., in the x direction) of the first positive electrode substrate connector 321 or a width 322W (e.g., in the x direction) of the second positive electrode substrate connector 322. In an implementation, the positive electrode fusible link 324 may be bent to then detour at least one or more times on the same plane with the positive electrode substrate connectors 321 and 322 to electrically connect the first positive electrode substrate connector 321 with the second positive electrode substrate connector 322. The term "detour" used herein may mean to deviate from the shortest linear distance between the first positive electrode substrate connector 321 and the second positive electrode substrate connector 322. For example, the positive electrode fusible link 324 having a relatively small width may connect the first positive electrode substrate connector 321 and the second positive electrode substrate connector 322 to each other in such a manner that it is elongated to increase resistance by making detours. For example, the positive electrode fusible link 324 may include two bending detour portions 324a and 324b, as shown in FIG. 5A. The positive electrode fusible link 324 may be meltable, e.g., may be melted when over-current is generated in the battery cell 100 electrically connected to the first positive cell connector 323, thereby cutting off electrical connection between the printed circuit board 310 and the battery cell 100.

The positive electrode stepped portion 325 may connect the first positive electrode substrate connector 321 with the first positive cell connector 323. The positive electrode stepped portion 325 may connect the first positive electrode substrate connector 321 with the first positive cell connector 323, which is positioned lower than the first positive electrode substrate connector 321 in the y direction, and may include at least one stepped portion. For example, the positive electrode stepped portion 325 may include at least one plane 325a parallel with the first positive electrode substrate connector 321 and the first positive cell connector 323. The positive cell tab 320 may have elasticity (e.g., may be elastically biased in the y direction) by or due to the positive electrode stepped portion 325, and may help prevent the battery cell 100 and the printed circuit board 310 from being electrically disconnected from each other due to an impact that may be generated when an electric vehicle moves.

The negative cell tab 330 may include a first negative electrode substrate connector 331, a second negative electrode substrate connector 332, a first negative cell connector 333, a negative electrode fusible link 334, and a negative electrode stepped portion 335. In an implementation, the first negative electrode substrate connector 331 and the second negative electrode substrate connector 332 may have substantially planar plate shapes, and may be electrically and mechanically connected to connection pads on the top surface of the printed circuit board 310. In an implementation, the connection pads may be electrically connected to voltage sensors through the circuit patterns on the printed circuit board 310. For example, the voltage sensors of the printed circuit board 310 may measure voltages of the battery cells 100 electrically connected to the negative cell tabs 330. The first negative electrode substrate connector 331 and the second negative electrode substrate connector 332 may be on the same plane and may be spaced a predetermined distance apart from each other.

Each of the first negative electrode substrate connector 331 and the second negative electrode substrate connector 332 may include at least one soldering hole 331a, 332a passing therethrough, e.g., between top and bottom surfaces. In an implementation, solder may be melted and filled in the soldering holes 331a and 332a in a state in which the first negative electrode substrate connector 331 and the second negative electrode substrate connector 332 of the negative cell tab 330 are mounted on the top surface of the connection pad of the printed circuit board 310, thereby electrically connecting the negative cell tab 330 and the printed circuit board 310. In an implementation, the first negative electrode substrate connector 331 and the second negative electrode substrate connector 332 may be on the connection pads on the printed circuit board 310.

In an implementation, the first negative electrode substrate connector 331 and the second negative electrode substrate connector 332 may further include position determining protrusions 331b and 332b, which downwardly protrude (e.g., into the PCM 300 in they direction), respectively. The position determining protrusions 331b and 332b may be inserted into position determining holes 312 in the printed circuit board 310 to determine positions of the printed circuit board 310, where the negative cell tab 330 is fixed and coupled. For example, the first negative electrode substrate connector 331 and the second negative electrode substrate connector 332 may help prevent the negative cell tab 330 from deviating from the printed circuit board 310 by the position determining protrusions 331b and 332b. The second negative electrode substrate connector 332 may be electrically connected to the bus bars 400 through the printed circuit board 310. In an implementation, the first negative electrode substrate connector 331 may be electrically connected to the connection pad of the printed circuit board 310 and may be electrically connected to the first negative cell connector 333 through the negative electrode stepped portion 335. For example, the first negative cell connector 333 may be electrically connected to the printed circuit board 310 through the negative electrode stepped portion 335 and the first negative electrode substrate connector 331.

The first negative cell connector 333 may be electrically connected to the negative electrode 120 at the top end of the battery cell 100 exposed through the throughhole 311 in the printed circuit board 310. The first negative cell connector 333 may have a substantially planar plate shape, e.g. a circular plate, which corresponds to the shape of (e.g., a facing surface of) the negative electrode 120 of the battery cell 100. The first negative cell connector 333 may be lower than the first positive electrode substrate connector 321 and the second positive electrode substrate connector 322 in the y direction.

The negative electrode fusible link 334 may electrically connect the first negative electrode substrate connector 331 and the second negative electrode substrate connector 332, which are spaced apart from each other. The negative electrode fusible link 334 may be on the same plane with the first negative electrode substrate connector 331 and the second negative electrode substrate connector 332. In an implementation, an insulation layer may be on the printed circuit board 310 lower than or below the negative electrode fusible link 334 (e.g., between the negative electrode fusible link 334 and the printed circuit board 310 in the y direction), and wiring patterns or circuit patterns may not be positioned or included on the insulation layer. A planar width 334W (e.g., in the z direction) of the negative electrode fusible link 334 may be smaller than a width 331W (e.g., in the z direction) of the first negative electrode substrate connector 331 or a width 332W (e.g., in the z direction) of the second negative electrode substrate connector 332. In an implementation, the negative electrode fusible link 334 may be bent to then detour at least one or more times on the same plane with the negative electrode substrate connectors 331 and 332 to electrically connect the first negative electrode substrate connector 331 with the second negative electrode substrate connector 332. The term "detour" used herein may mean to deviate from the shortest linear distance between the first negative electrode substrate connector 331 and the second negative electrode substrate connector 332. For example, the negative electrode fusible link 334 (having a relatively small width) may connect the first negative electrode substrate connector 331 and the second negative electrode substrate connector 332 to each other in such a manner that it is elongated to increase resistance by making detours. For example, the negative electrode fusible link 334 may include two bending detour portions 334a and 334b, as shown in FIG. 5B. The negative electrode fusible link 334 may be melted when over-current is generated in the battery cell 100 electrically connected to the first negative cell connector 333, thereby cutting off electrical connection between the printed circuit board 310 and the battery cell 100.

The negative electrode stepped portion 335 may connect the first negative electrode substrate connector 331 with the first negative cell connector 333. The negative electrode stepped portion 335 may connect the first negative electrode substrate connector 331 with the first negative cell connector 333, which may be lower than the first negative electrode substrate connector 331 in the y direction, and may include at least one stepped portion. For example, the negative electrode stepped portion 335 may include at least one plane 335a parallel with the first negative electrode substrate connector 331 and the first negative cell connector 333. The negative cell tab 330 may have elasticity (e.g., may be elastically biased in the y direction) by or due to the negative electrode stepped portion 335, and may help prevent the battery cell 100 and the printed circuit board 310 from being electrically disconnected from each other due to an impact that may be generated when an electric vehicle moves.

The connection tab 340 may include a first electrode substrate connector 341, a second electrode substrate connector 342, a first cell connector 343, a second cell connector 344, a fusible link 345, a first stepped portion 346, and a second stepped portion 347. The first electrode substrate connector 341 and the second electrode substrate connector 342 may have substantially planar plate shapes, and may be electrically and mechanically connected to connection pads on the top surface of the printed circuit board 310. In an implementation, the connection pads may be electrically connected to voltage sensors through the circuit patterns provided on the printed circuit board 310. For example, the voltage sensors of the printed circuit board 310 may measure voltages of the battery cells 100 electrically connected to the positive cell tabs 340. The first electrode substrate connector 341 and the second electrode substrate connector 342 may be on the same plane and may be spaced a predetermined distance apart from each other.

Each of the first electrode substrate connector 341 and the second electrode substrate connector 342 may include at least one soldering hole 341a, 342a passing therethrough, e.g., between top and bottom surfaces. In an implementation, solder may be melted and filled in the soldering holes 341a, 342a in a state in which the first electrode substrate connector 341 and the second electrode substrate connector 342 of the connection tab 340 are mounted on the top surface of the connection pad of the printed circuit board 310, thereby electrically connecting the connection tab 340 and the printed circuit board 310. In an implementation, the first electrode substrate connector 341 and the second electrode substrate connector 342 may be mounted on the connection pads on the printed circuit board 310.

In an implementation, the first electrode substrate connector 341 and the second electrode substrate connector 342 may further include position determining protrusions 341b and 342b, which downwardly protrude (e.g., into the PCM 300 in the y direction), respectively. The position determining protrusions 341b and 342b may be inserted into the position determining holes 312 in the printed circuit board 310 to determine positions of the printed circuit board 310, where the connection tab 340 is fixed and coupled. For example, the first electrode substrate connector 341 and the second electrode substrate connector 342 may help prevent the connection tab 340 from deviating from the printed circuit board 310 by the position determining protrusions 341b and 342b. The first electrode substrate connector 341 may be electrically connected to the connection pad of the printed circuit board 310 and may be electrically connected to the first cell connector 343 through the first stepped portion 346. For example, the first cell connector 343 may be electrically connected to the printed circuit board 310 through the first stepped portion 346 and the first electrode substrate connector 341. The second electrode substrate connector 342 may be electrically connected to the connection pad of the printed circuit board 310 and may be electrically connected to the second cell connector 344 through the second stepped portion 347. For example, the second cell connector 344 may be electrically connected to the printed circuit board 310 through the second stepped portion 347 and the second electrode substrate connector 342.

The first cell connector 343 may be a region electrically connected to the positive electrode 110 at the top end of a first battery cell 100A exposed through the throughhole 311 in the printed circuit board 310. The first cell connector 343 may have a substantially planar plate shape, which may correspond to the shape of the (e.g., facing surface of the) positive electrode 110 of the first battery cell 100A. For example, the first cell connector 343 may be positioned lower than the first electrode substrate connector 341 and the second electrode substrate connector 342, e.g., in the y direction.

The second cell connector 344 may be electrically connected to the negative electrode 120 at the top end of a second battery cell 100B exposed through the throughhole 311 in the printed circuit board 310. The second battery cell 100B may be a battery cell belonging to or in the same battery group 101 as the first battery cell 100A electrically connected to the first cell connector 343. In an implementation, the second battery cell 100B may be a battery cell adjacent to the first battery cell 100A, among the battery cells 100 arranged on the same line in the second direction (z direction). For example, the first battery cell 100A and the second battery cell 100B may refer to arbitrary two battery cells nearest to each other among the battery cells belonging to the same battery group 101. The second cell connector 344 may have a substantially planar plate shape, which corresponds to the shape of (e.g., a facing surface of) the negative electrode 120 of the battery cell 100. In an implementation, the second cell connector 344 may be lower than the first electrode substrate connector 341 and the second electrode substrate connector 342 (e.g., in the y direction).

Figure 6A:
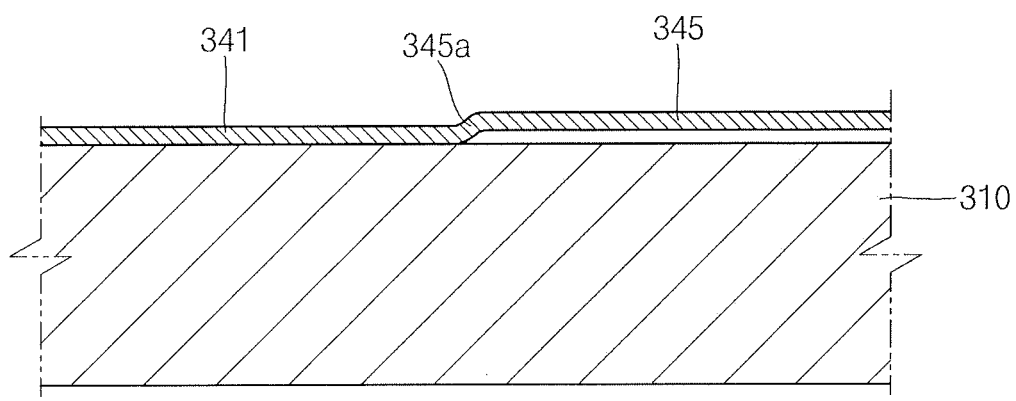
FIGS. 6A and 6B illustrate examples of cross-sectional views taken along the line 6-6 of FIG. 4C.

The fusible link 345 may electrically connect the first electrode substrate connector 341 and the second electrode substrate connector 342, which are spaced apart from each other. The fusible link 345 may be higher than the first electrode substrate connector 341 and the second electrode substrate connector 342 (e.g., in the y direction). For example, as illustrated in FIG. 6A, the fusible link 345 may be spaced apart in the y direction (e.g., upwardly) from the top surface of the printed circuit board 310. For example, the fusible link 345 may include a bent portion 345a at a portion where the first electrode substrate connector 341 and the second electrode substrate connector 342 are connected to each other. For example, the fusible link 345 may be upwardly spaced apart from the top surface of the printed circuit board 310, and it may help prevent the printed circuit board 310 from being damaged when the fusible link 345 is melted when over-current is generated due to the internal short circuit of the battery cell 100. Circuit patterns may be densely located around wiring patterns of the printed circuit board 310 so as to be electrically connected to the connection tabs 340. For example, when the fusible link 345 is melted, it may be spaced apart from the top surface of the printed circuit board 310 to help prevent the circuit patterns and the connection patterns in the printed circuit board 310 from being damaged.

Figure 6B:
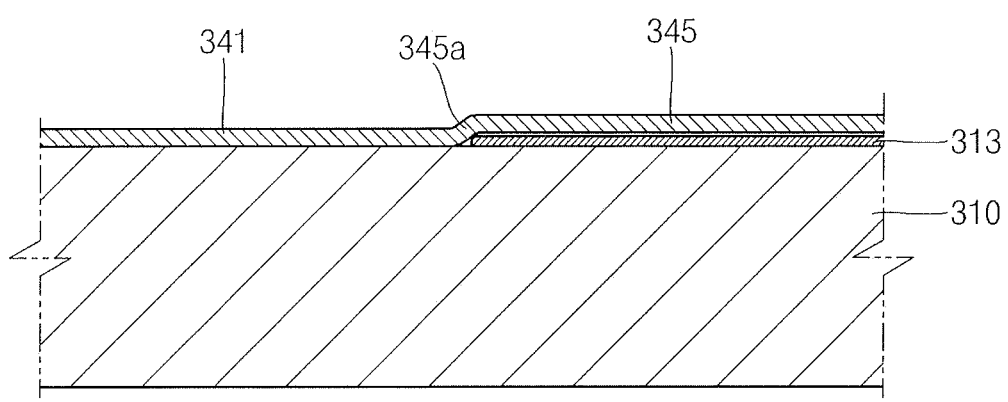

In an implementation, as illustrated in FIG. 6B, a flame-retardant coating 313 may be included on a region between the top surface of the printed circuit board 310 and the fusible link 345 (e.g., in the y direction). In order to help prevent the circuit patterns and the connection patterns in the printed circuit board 310 from being damaged when the fusible link 345 is melted, the flame-retardant coating 313 may be coated on the top surface of the printed circuit board 310 below the fusible link 345. The fusible link 345 may be spaced apart from the top surface of the printed circuit board 310 or the flame-retardant coating 313 may be coated on the top surface of the printed circuit board 310, and it is possible to help prevent the circuit patterns provided in the printed circuit board 310 from being damaged when the fusible link 345 is melted.

A planar width 345W (e.g., in the x direction) of the fusible link 345 may be smaller than a width 341W (e.g., in the z direction) of the first electrode substrate connector 341 or a width 342W (e.g., in the z direction) of the second electrode substrate connector 342. In an implementation, the fusible link 345 may be bent to then detour at least one or more times on the same plane with the substrate connectors 341 and 332 to electrically connect the first electrode substrate connector 341 with the second electrode substrate connector 342. The term "detour" used herein may mean to deviate from the shortest linear distance between the first electrode substrate connector 341 and the second electrode substrate connector 342. For example, the fusible link 345 having a relatively small width may connect the first electrode substrate connector 341 and the second electrode substrate connector 342 to each other in such a manner that it is elongated to increase resistance by making detours. For example, the fusible link 345 may include one bending detour portion 345a, as shown in FIG. 5C. The fusible link 345 may be melted when over-current is generated in the battery cell 100 electrically connected to the first cell connector 343 or the second cell connector 344, thereby cutting off electrical connection between the battery cells 100 connected by the connection tab 340.

The first stepped portion 346 may connect the first electrode substrate connector 341 with the first cell connector 343. The first stepped portion 346 may connect the first electrode substrate connector 341 with the first cell connector 343, which is lower than the first electrode substrate connector 341 (e.g., in the y direction), and may include at least one stepped portion. For example, the first stepped portion 346 may include at least one plane 346a parallel with the first electrode substrate connector 341 and the first cell connector 343. The connection tab 340 may have elasticity (e.g., may be elastically biased in the y direction) by or due to the first stepped portion 346 and may help prevent the battery cell 100 and the printed circuit board 310 from being electrically disconnected from each other due to an impact that may be generated when an electric vehicle moves.

The second stepped portion 347 may connect the second electrode substrate connector 342 with the second cell connector 344. The second stepped portion 347 may connect the second electrode substrate connector 342 with the second cell connector 344, which is lower than the second electrode substrate connector 342 (e.g., in the y direction), and may include at least one stepped portion. For example, the second stepped portion 347 may include at least one plane 347a parallel with the second electrode substrate connector 342 and the second cell connector 344. The connection tab 340 may have elasticity (e.g., may be elastically biased in the y direction) by or due to the second stepped portion 347, and may help prevent the battery cell 100 and the printed circuit board 310 from being electrically disconnected from each other due to an impact that may be generated when an electric vehicle moves.

The connection tabs 340 may electrically connect (e.g., in series or in parallel) neighboring battery cells among the plurality of battery cells 100 arranged on the same line in the second direction (z direction). For example, the connection tabs 340 may electrically connect (e.g., in series or in parallel) the battery cells 100 belonging to one of the battery groups 101. In an implementation, the connection tabs 340 may have a structure in which one end thereof is electrically connected to a negative electrode 120 of one battery cell 100 and another end thereof is electrically connected to a positive electrode 110 of an adjacent battery cell 100, as described above, such that the battery cells 100 (e.g., a battery group 101) are connected in series. In another implementation, the connection tabs 340 may have a structure in which one end of one part thereof is electrically connected to a negative electrode 120 of one battery cell 100 and another end of the one part thereof is electrically connected to a negative electrode 120 of an adjacent battery cell 100, and a structure in which one end of another part thereof is electrically connected to a positive electrode 110 of the one battery cell 100 and another end of the other part thereof is electrically connected to a positive electrode 110 of the adjacent battery cell 100, such that the adjacent battery cells 100 (e.g., a battery group 101) are connected in parallel.

In an implementation, the positive cell tabs 320 may be positive electrode terminals of the battery groups 101 connected in series or in parallel, and the negative cell tabs 330 may be negative electrode terminals of the battery groups 101 connected in series or in parallel. The plurality of positive cell tabs 320 may be electrically connected to the positive electrode bus bar 410 through the printed circuit board 310, and the plurality of negative cell tabs 330 may be electrically connected to the negative electrode bus bar 420 through the printed circuit board 310. For example, the plurality of battery groups 101 may be electrically connected in parallel to one another through the positive cell tabs 320, the negative cell tabs 330, and the bus bars 400.

The bus bars 400 may include the positive electrode bus bar 410, the negative electrode bus bar 420, and a fuse 430. The positive electrode bus bar 410 and the negative electrode bus bar 420 may be accommodated in the holder 200 together with the battery cells 100. The positive electrode bus bar 410 and the negative electrode bus bar 420 may connect the plurality of battery groups 101 (e.g., in parallel) through the PCM 300. In an implementation, the fuse 430 may be in the negative electrode bus bar 420. The fuse 430 may be between two negative electrode bus bars 420 and 421. The fuse 430 may cut off the current when internal or external short circuits are generated in the battery pack 10. In an implementation, the positive electrode bus bar 410 and the negative electrode bus bar 420 may be electrically connected to input/output terminals of the battery pack 10 through a connector.

The case 500 may include an upper case 510 and a lower case 520, which are assembled with each other in opposite directions in a state in which the battery cells 100, the holder 200, the PCM 300, and the bus bars 400 are positioned therebetween. The lower case 520 may have a hexahedron shape having an opening at its top end. In an implementation, the upper case 510 may be assembled or coupled with the lower case 520, e.g., at the opening at the top end of the lower case 520, to place the battery cells 100, the holder 200, the PCM 300, and the bus bars 400 in the case 500. The upper case 510 and the lower case 520 may be assembled along the third direction (y). In an implementation, the lower case 520 may further include a plurality of receivers 521 to receive or accommodate bottoms (e.g., an end in a lengthwise or y direction) of the battery cells 100. The receivers 521 may be at locations corresponding to or aligned with the plurality of receivers 210 of the holder 200. A bottom surface 522 of the lower case 520 may be made of a metallic material and may be brought into contact with bottom surfaces of plurality of battery cells 100. The bottom surface 522 of the lower case 520 may be used as a heat dissipation pad of the plurality of battery cells 100.

One or more embodiments may provide a battery pack which may help improve battery safety by connecting two neighboring battery cells in series or in parallel and installing a fusible link in a connection tab electrically connected to a printed circuit board.

The battery pack according to an embodiment may help improve battery safety by connecting two neighboring battery cells in series or in parallel, and installing a fusible link in a connection tab electrically connected to a printed circuit board, so that the fusible link is meltable to cut off an electrical connection with other battery cells if the respective battery cells are damaged due to external impacts or overcurrent.

In addition, the battery pack according to an embodiment may help prevent circuit patterns of the printed circuit board from being damaged during melting by making the fusible link of the connection tab, at a region where the circuit patterns are integrated, spaced apart from a top surface of the printed circuit board.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A battery pack, comprising:
   a plurality of battery cells, each battery cell having a positive electrode and a negative electrode on a top surface of the battery cell, the plurality of battery cells being arranged in a first direction and in a second direction crossing the first direction;
   a protective circuit module, the protective circuit module including:
      a printed circuit board on the plurality of battery cells, and
      a plurality of conductive tabs on the printed circuit board and electrically connecting the plurality of battery cells; and
   a case accommodating the plurality of battery cells and the protective circuit module,
   wherein each of the conductive tabs includes:
      a substrate connector connected to the printed circuit board,
      a cell connector electrically connected to a battery cell of the plurality of battery cells, and
      a fusible link extending from the substrate connector and having a width that is smaller than that of the substrate connector,
   wherein the substrate connector includes:
      a first electrode substrate connector directly connected to the printed circuit board and connected to the cell connector such that the first electrode substrate connector is between the cell connector and the fusible link, and
      a second electrode substrate connector directly connected to the printed circuit board and spaced apart from the first electrode substrate connector on the same plane,
   wherein the fusible link is between the first electrode substrate connector and the second electrode substrate connector, connects the first electrode substrate connector with the second electrode substrate connector, and is bent to then detour at least one times on a plane, and
   wherein the fusible link is spaced apart from a top surface of the printed circuit board in a third direction crossing the first direction and the second direction.

2. The battery pack as claimed in claim 1, further comprising a flame-retardant coating between the top surface of the printed circuit board and the fusible link.

3. The battery pack as claimed in claim 1, wherein the cell connector is lower than the substrate connector and includes at least one stepped portion connecting the cell connector with the substrate connector.

4. The battery pack as claimed in claim 1, wherein the conductive tabs include:
   a plurality of connection tabs connecting a row of neighboring battery cells in the second direction;
   a plurality of positive cell tabs electrically connected to a first column of battery cells at a first side of the plurality of battery cells, the first column of battery cells being arranged in the first direction; and
   a plurality of negative cell tabs electrically connected to a second column of battery cells at a second side of the plurality of battery cells, the second column of battery cells being arranged in the first direction.

5. The battery pack as claimed in claim 4, wherein the plurality of connection tabs, the plurality of positive cell tabs, and the plurality of negative cell tabs are on a top surface of the printed circuit board.

6. The battery pack as claimed in claim 5, wherein:
   the printed circuit board includes a plurality of throughholes passing therethrough, the plurality of throughholes being aligned with tops of the plurality of battery cells, and
   the plurality of connection tabs, the plurality of positive cell tabs, and the plurality of negative cell tabs pass through the throughholes and are electrically connected to the plurality of battery cells, respectively.

7. The battery pack as claimed in claim 4, further comprising:
   a holder, the holder:
      including a plurality of receivers arranged in the first direction and the second direction, the plurality of receivers passing through the holder,
      accommodating the plurality of battery cells in the receivers, and
      having the protective circuit module thereon; and
   bus bars in the holder, the bus bars including:
      a positive bus bar electrically connected to the plurality of positive cell tabs through the printed circuit board, and
      a negative bus bar electrically connected to the plurality of negative cell tabs through the printed circuit board.

8. The battery pack as claimed in claim 7, further comprising a fuse in the negative bus bar, the fuse being cut off when an internal short circuit or an external short circuit is generated in the battery pack.

9. A battery pack, comprising:
a plurality of battery cells, each battery cell having a positive electrode and a negative electrode on a top surface of the battery cell, the plurality of battery cells being arranged in a row direction and in a column direction crossing the row direction;
a protective circuit module, the protective circuit module including:
  a printed circuit board on the plurality of battery cells, and
  a plurality of conductive tabs on the printed circuit board and electrically connecting the plurality of battery cells; and
a case accommodating the plurality of battery cells and the protective circuit module,
wherein the plurality of conductive tabs include:
  a plurality of connection tabs electrically connecting a row of neighboring battery cells in the row direction, electrically connecting the one battery cell to the printed circuit board, and electrically connecting the printed circuit board to the neighboring battery cell;
  a plurality of positive cell tabs electrically connecting a first column of battery cells at a first side of the plurality of battery cells to the printed circuit board, the first column of battery cells being arranged in the column direction; and
  a plurality of negative cell tabs electrically connecting a second column of battery cells at a second side of the plurality of battery cells to the printed circuit board, the second column of battery cells being arranged in the column direction, and
wherein each of the connection tabs, the positive cell tabs, and the negative cell tabs includes:
  a substrate connector connected to the printed circuit board,
  a cell connector electrically connected to a battery cell of the plurality of battery cells, and
  a fusible link extending from the substrate connector and having a width that is smaller than that of the substrate connector, the substrate connector being between the cell connector and the fusible link.

10. A battery pack in which a plurality of battery cells are accommodatable, each battery cell having a positive electrode and a negative electrode on a top surface thereof and the plurality of battery cells being arrangeable in a row direction and in a column direction crossing the row direction, the battery pack comprising:
a protective circuit module, the protective circuit module including:
  a printed circuit board to cover the plurality of battery cells, and
  a plurality of conductive tabs on the printed circuit board to electrically connect the plurality of battery cells; and
a case to accommodate the plurality of battery cells and the protective circuit module,
wherein each of the conductive tabs include:
  a substrate connector connected to the printed circuit board,
  a cell connector to electrically connect to a battery cell of the plurality of battery cells, and
  a fusible link extending from the substrate connector and having a width that is smaller than that of the substrate connector, and
wherein the substrate connector includes:
  a first electrode substrate connector directly connected to the printed circuit board and connected to the cell connector such that the first electrode substrate connector is between the cell connector and the fusible link, and
  a second electrode substrate connector directly connected to the printed circuit board and spaced apart from the first electrode substrate connector on the same plane, and
wherein the fusible link is between the first electrode substrate connector and the second electrode substrate connector, connects the first electrode substrate connector with the second electrode substrate connector, and is bent to then detour at least one times on a plane.

* * * * *